United States Patent
Williams et al.

(10) Patent No.: US 9,758,067 B2
(45) Date of Patent: Sep. 12, 2017

(54) CHILD SAFETY SEAT AND CROTCH BELT ASSEMBLY THEREOF

(71) Applicants: Bruce Williams, Narvon, PA (US); Gregory S. Sellers, Christiana, PA (US)

(72) Inventors: Bruce Williams, Narvon, PA (US); Gregory S. Sellers, Christiana, PA (US)

(73) Assignee: Wonderland Nurserygoods Company Limited, NT (HK)

( * ) Notice: Subject to any disclaimer, the term of this patent is extended or adjusted under 35 U.S.C. 154(b) by 29 days.

(21) Appl. No.: 14/845,245

(22) Filed: Sep. 3, 2015

(65) Prior Publication Data
US 2016/0068084 A1    Mar. 10, 2016

Related U.S. Application Data

(60) Provisional application No. 62/070,885, filed on Sep. 8, 2014.

(51) Int. Cl.
    *B60N 2/28*    (2006.01)
(52) U.S. Cl.
    CPC .... *B60N 2/2812* (2013.01); *B60N 2002/2818* (2013.01)
(58) Field of Classification Search
    CPC ................ B60N 2/2812; B60N 2002/2818
    USPC .................. 297/256.15, 467, 487
    See application file for complete search history.

(56) References Cited

U.S. PATENT DOCUMENTS

| 5,395,154 | A | * | 3/1995 | Wang | A47D 1/02 280/30 |
|---|---|---|---|---|---|
| 5,899,534 | A | * | 5/1999 | Gray | B60N 2/3084 297/238 |
| 6,196,629 | B1 | * | 3/2001 | Onishi | B60N 2/2806 297/256.12 |
| 6,378,950 | B1 | * | 4/2002 | Takamizu | B60N 2/0284 297/250.1 |
| 6,588,849 | B2 | * | 7/2003 | Glover | A47D 13/02 297/250.1 |

(Continued)

FOREIGN PATENT DOCUMENTS

| CN | 1097695 A | 1/1995 |
|---|---|---|
| CN | 1347676 A | 5/2002 |

(Continued)

*Primary Examiner* — Syed A Islam
(74) *Attorney, Agent, or Firm* — Winston Hsu

(57) ABSTRACT

The child safety seat provides a crotch belt assembly to allow the consumer to adjust the crotch belt's position and length without disassembling the child restraint. The positioner uses two tab-like abutting ends that can slide within the channels so that the positioner may be configured at different positions with respect to the seat section, allowing for quick adjustability from a rear position to a forward position and vice versa. The crotch belt runs through the positioner and is connected to the seat shell with the belt attachment. The rear position will be used for the smaller child and is locked into that position by the second abutting end. The second abutting end is depressed and the positioner is slid forward until the first abutting end engages. During this process, the length of the crotch belt will automatically adjust for proper fit for the larger child.

10 Claims, 8 Drawing Sheets

(56) References Cited

U.S. PATENT DOCUMENTS

| | | | | |
|---|---|---|---|---|
| 8,752,895 B2* | 6/2014 | Fritz | ............... | B60N 2/2806 297/250.1 |
| 8,955,915 B2* | 2/2015 | Mason | ............... | B60N 2/2812 297/216.11 |
| 2002/0109391 A1* | 8/2002 | Shie | ............... | B60N 2/2812 297/467 |
| 2007/0228788 A1* | 10/2007 | Meeker | ............... | B60N 2/2806 297/250.1 |
| 2008/0168603 A1* | 7/2008 | Ayette | ............... | A61G 1/044 5/628 |
| 2009/0127902 A1* | 5/2009 | Meeker | ............... | B60N 2/2812 297/250.1 |
| 2011/0057491 A1* | 3/2011 | Nolan | ............... | B60N 2/0232 297/256.15 |
| 2012/0098304 A1* | 4/2012 | Gaudreau, Jr. | ...... | B60N 2/2812 297/216.11 |
| 2013/0099536 A1 | 4/2013 | Mason | | |
| 2015/0028648 A1* | 1/2015 | Sparling | ............... | B60R 22/12 297/452.1 |

FOREIGN PATENT DOCUMENTS

| | | | |
|---|---|---|---|
| CN | 101954897 A | 1/2011 |
| DE | 3445353 A1 | 6/1985 |
| WO | 9624506 A1 | 8/1996 |

* cited by examiner

CHILD SAFETY SEAT AND CROTCH BELT ASSEMBLY THEREOF

CROSS REFERENCE TO RELATED APPLICATIONS

This application claims the benefits of U.S. Provisional Application No. 62/070,885, which was filed on Sep. 8, 2014 and is incorporated herein by reference.

BACKGROUND OF THE INVENTION

1. Field of the Invention

The invention relates to a child apparatus, and more particularly, to a child safety seat having crotch belt assembly with adjustable position.

2. Description of the Prior Art

A large variety of child safety seats that include infant car seats and convertible car seats are available in today's market. As these seats continue to advance in weight rating, the need to easily adjust the harness to fit either small or larger occupants has become an important issue for proper fit. One part of the harness that must be adjusted for occupant size is the crotch belt. It is positioned between the occupant's legs, and ideally adjusted for both position and length. A conventional crotch belt has a buckle on one end and a metal bracket connected to the other end for attachment to the seat shell of a child safety seat. The crotch belt is threaded through a slot in the child safety seat and the bracket retains the belt in the event of a crash. Most of the seats in today's market will have two slots for this adjustment.

In order to adjust the position of the crotch belt in many of these seats, the caregiver is required to unbuckle the crotch belt, remove the bracket from the slot in the seat shell and re-assemble the crotch belt in another slot. Seats that allow length adjustment usually require the crotch belt to be threaded through a second slot in the seat. Although this is common practice for crotch belt adjustment, it can be confusing and difficult, and can result in incorrect assembly of the crotch belt.

SUMMARY OF THE INVENTION

To solve the above mentioned problems, a child safety seat and a crotch belt assembly for the child safety seat are provided by the embodiments of the invention.

According to an embodiment of the invention, a child safety seat is provided that includes a seat shell, a positioner, and a crotch belt. The seat shell includes a backrest section and a seat section having an opening. The positioner is movably disposed in the opening and is configurable at a first position or a second position with respect to the seat section. The positioner includes a slit. A first end of the crotch belt passes through the slit and extends from a first side of the seat section. A second end of the crotch belt extends from a second side of the seat section and is further fixed to the seat section. The crotch belt is moveable with the positioner with respect to the seat section. A first space bounded by the crotch belt, the backrest section, and the seat section when the crotch belt and the positioner are configured at the first position is smaller than a second space bounded by the crotch belt, the backrest section, and the seat section when the crotch belt and the positioner are configured at the second position.

According to another embodiment of the invention, a crotch belt assembly for being used on a child safety seat is provided. The child safety seat has a backrest section and a seat section having an opening. The crotch belt assembly includes a positioner and a crotch belt. The positioner is movably disposed in the opening and is configurable at a first position or a second position with respect to the seat section. The positioner includes a slit. A first end of the crotch belt passes through the slit and extends from a first side of the seat section. A second end of the crotch belt extends from a second side of the seat section and is further fixed to the seat section. The crotch belt is moveable with the positioner with respect to the seat section. A first space bounded by the crotch belt, the backrest section, and the seat section when the crotch belt and the positioner are configured at the first position is smaller than a second space bounded by the crotch belt, the backrest section, and the seat section when the crotch belt and the positioner are configured at the second position.

According to the embodiments of the invention, the positioner and the crotch belt are moveable with respect to the seat section along a first direction toward the backrest section to be configured at the first position with a corresponding shortening of the crotch belt and along a second direction away from the backrest section to be configured at the second position with a corresponding lengthening of the crotch belt.

According to the embodiments of the invention, the seat section has a first channel between the first side and the second side of the seat section and extending from the opening toward the backrest section, and the seat section has a second channel between the first side and the second side of the seat section and extending from the opening away from the backrest section.

According to the embodiments of the invention, the positioner includes a first abutting end moveable in the first channel and a second abutting end moveable in the second channel. The first abutting end, the slit, and the second abutting end align sequentially along a second direction away from the backrest section.

According to the embodiments of the invention, the opening is defined by at least a first wall and a second wall located nearest and farthest from the backrest section respectively. When the positioner is configured at the first position, the second abutting end is located out of the second channel and abuts against the second wall to retain the positioner at the first position. When the positioner is configured at the second position, the first abutting end is located out of the first channel and abuts against the first wall to retain the positioner at the second position.

According to the embodiments of the invention, the first abutting end and the second abutting end have wedged cross sections with decreasing thickness toward the slit.

According to the embodiments of the invention, the seat section further includes a belt attachment detachably assembled to an outer opening of the seat section, and the belt attachment passes through the second end of the crotch belt so that the second end of the crotch belt is fixed to the seat section.

According to the embodiments of the invention, the crotch belt further includes a buckle attached to the first end.

The child safety seat provides at its seat section a crotch belt assembly to allow the consumer to adjust the crotch belt location without the need to disassemble the child restraint. The positioner may be configured at the first position or the second position with respect to the seat section, allowing for quick adjustability from a rear position to a forward position and will give a proper fit for the occupant while reducing the chance for incorrect assembly.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct mechanical connection. Thus, if a first device is coupled to a second device, that connection may be through a direct mechanical connection, or through an indirect mechanical connection via other devices and connections.

Figure 1:
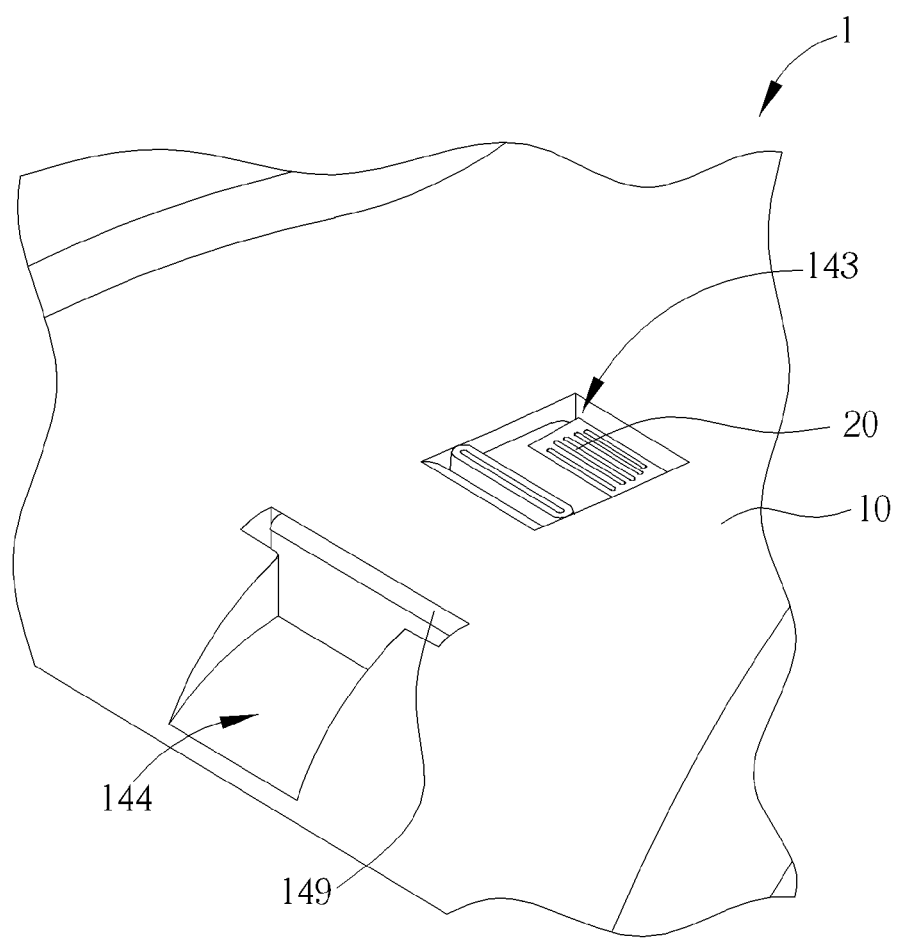
FIG. 1 is a schematic diagram showing partial perspective view of a child safety seat according to a first embodiment of the invention.
Figure 2:
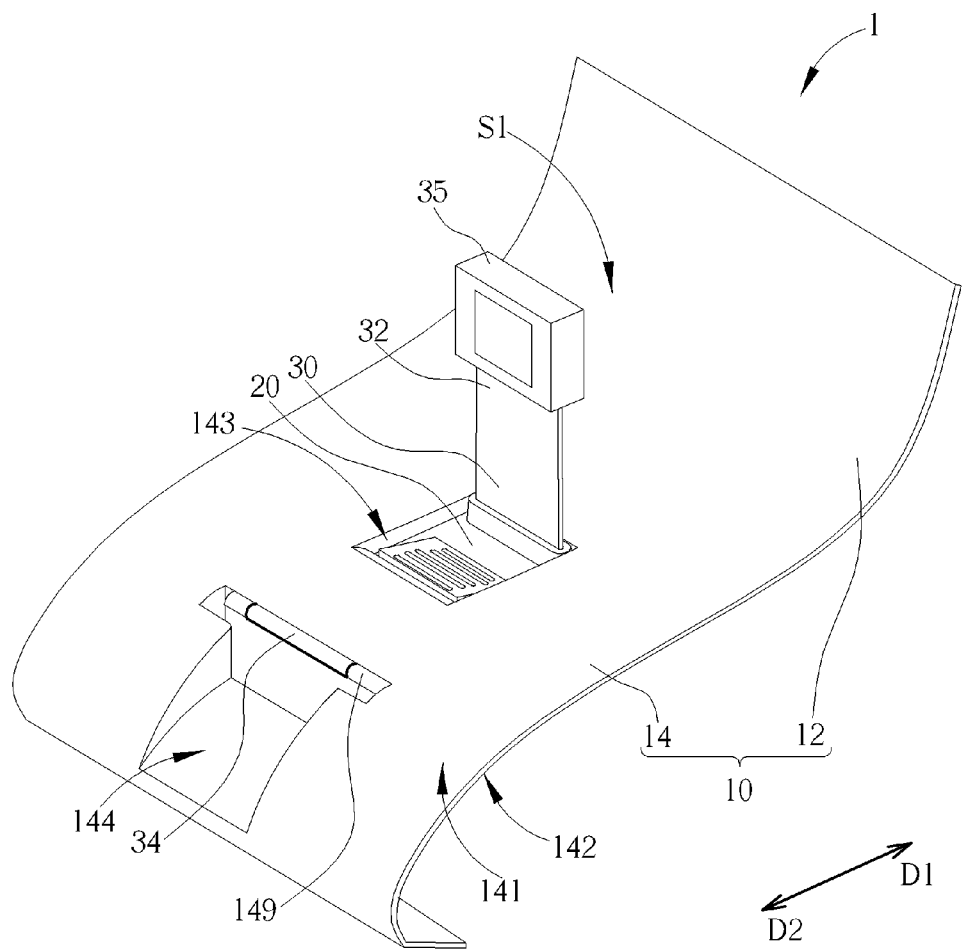
FIG. 2 is a schematic diagram showing a first status of the child safety seat according to an embodiment of the invention.
Figure 3:
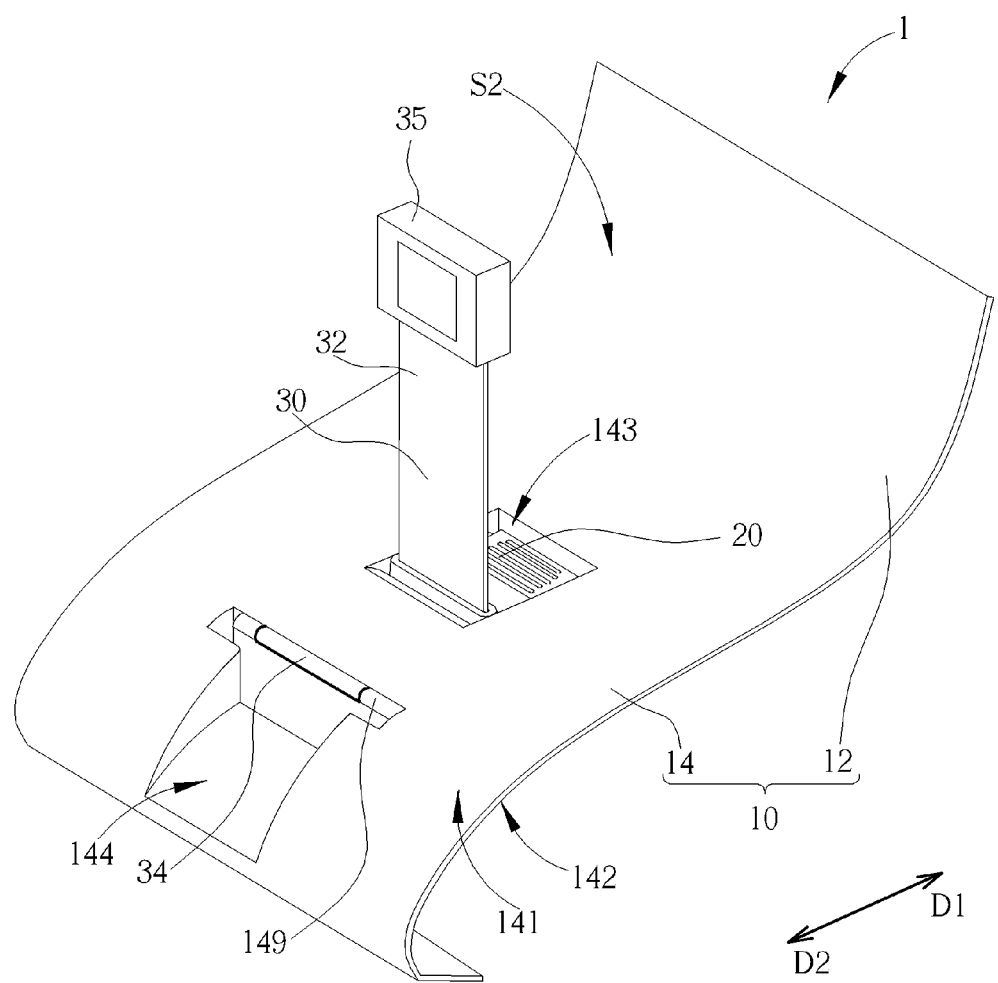
FIG. 3 is a schematic diagram showing a second status of the child safety seat according to an embodiment of the invention.

Please refer to FIG. 1. FIG. 1 is a schematic diagram showing partial perspective view of a child safety seat according to a first embodiment of the invention. A child safety seat 1 can either be an infant car seat or a convertible car seat for use in a vehicle or a seat for a stroller. Please also refer to FIG. 2 and FIG. 3. FIG. 2 is a schematic diagram shows a first status of the child safety seat according to an embodiment of the invention, and FIG. 3 is a schematic diagram shows a second status of the child safety seat according to an embodiment of the invention. The child safety seat 1 has a seat shell 10 for supporting an occupant. The seat shell 10 is composed by a backrest section 12 and a seat section 14. The child safety seat 1 also includes a positioner 20 and a crotch belt 30 disposed at the seat shell 10 for further harness between the legs of the occupant. More specifically, the seat section 14 has an opening 143 and an outer opening 144. The opening 143 is located roughly at the middle of the seat section 14 and the outer opening 144 is located at the front of the seat section 14. The positioner 20 is movably disposed in the opening 143 and is configurable at a first position as shown in FIG. 2 or a second position as shown in FIG. 3 with respect to the seat section 14.

Figure 7:
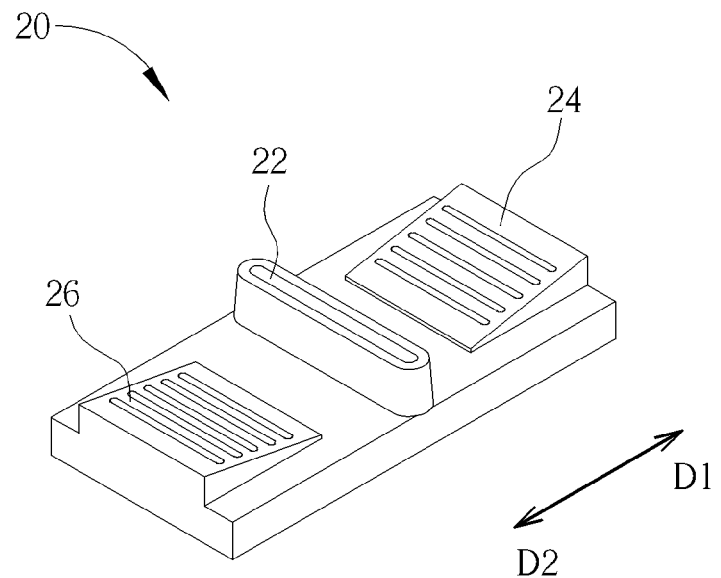
FIG. 7 is a schematic diagram of a perspective view of the positioner.
Figure 8:
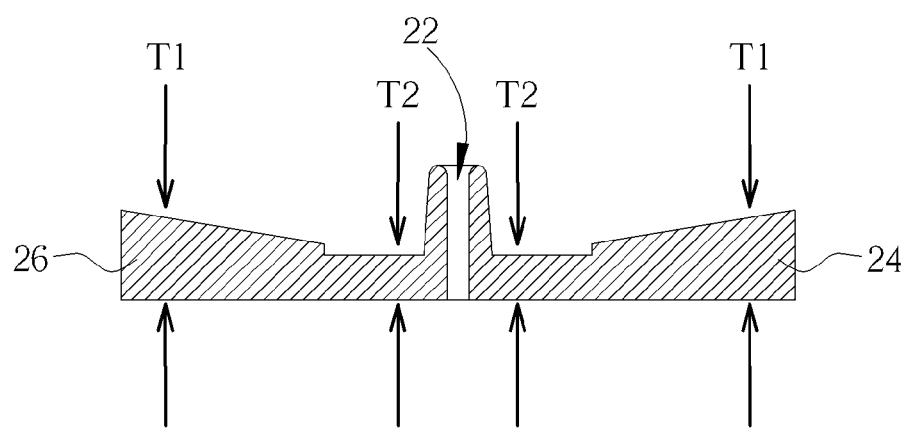
FIG. 8 is a schematic diagram of a side view of the positioner.

As shown in FIG. 2 and FIG. 3, the seat section 14 has a first side 141 (the top side) and a second side 142 (the bottom side) and both the opening 143 and the outer opening 144 are through holes between the first side 141 and the second side 142. The crotch belt 30 has a first end 32 and a second end 34 and passes through the opening 143, in particular, through a slit 22 of the positioner 20 (the slit 22 of the positioner 20 is shown in FIG. 7 and FIG. 8) disposed in the opening 143, so that the first end 32 extends from the first side 141 of the seat section 14, with a buckle 35 further attached to the first end 32, and the second end 34 extends from the second side 142 of the section 14 and the second end 34 may be further fixed to the seat section 14. In detail, the embodiment in FIGS. 1-3 shows that the seat section 14 has a belt attachment 149 (a rod in particular) detachably assembled to the outer opening 144 of the seat section 14, and the belt attachment passes through the second end 34 (a sewed ring-shape end) of the crotch belt 30 so that the second end 34 can be fixed to the seat section 14. However, there can be another way of fixing the second end 34 of the crotch belt 30 to the seat section 14 and the embodiment as illustrated should not be regarded as limiting.

The crotch belt 30 that passes through the positioner 20 moves with the positioner 20 when the positioner 20 moves to be configured at the first position or the second position with respect to the seat section 14. When the crotch belt 30 and the positioner 20 move along a first direction D1 toward the backrest section 12 to be configured at the first position as shown in FIG. 2, a first space S1 is bounded by the crotch belt 30, the backrest section 12, and the seat section 14. When the crotch belt 30 and the positioner 20 move along a second direction D2 away from the backrest section 12 to be configured at the second position as shown in FIG. 3, a second space S2 is bounded by the crotch belt 30, the backrest section 12, and the seat section 14. It should be noted that the first space S1 is smaller than the second space S2 due to the adjustment of the positioner 20, as well as the automatic shortening or lengthening of the length of the crotch belt 30. The position of the crotch belt 30 is adjusted to different positions so that the child safety seat 1 has its harness adjustable to fit either a small occupant (by moving the positioner 20 and the crotch belt 30 to the first position, which automatically shortens the crotch belt 30, as in FIG. 2) or a larger occupant (by moving the positioner 20 and the crotch belt 30 to the second position, which automatically lengthens the crotch belt 30, as in FIG. 3).

Figure 4:
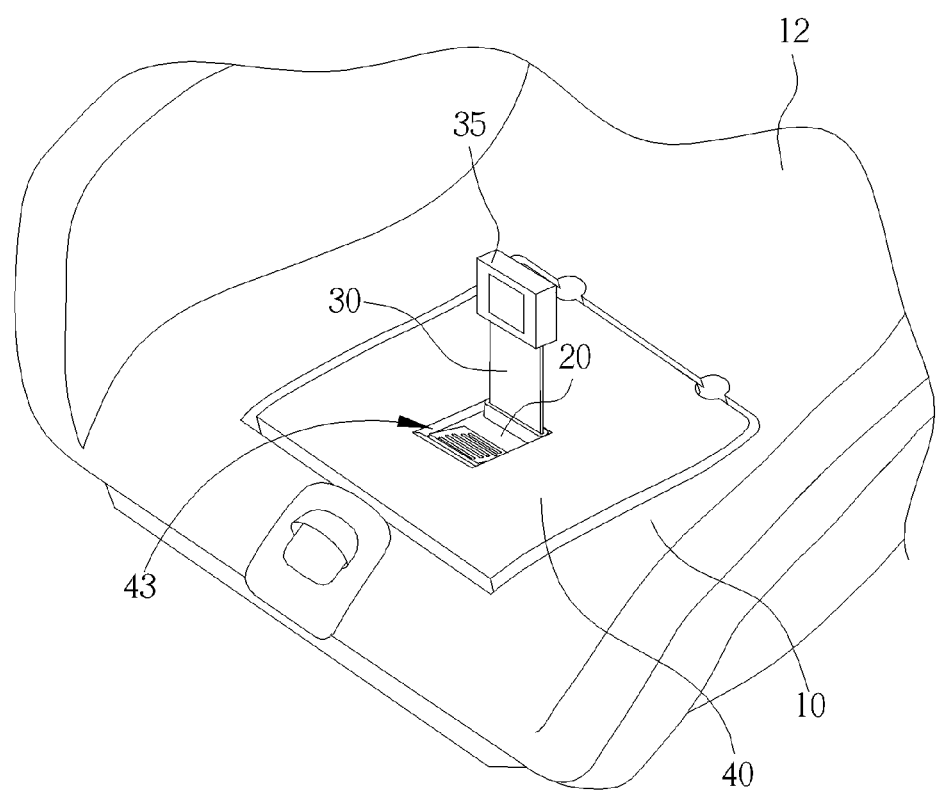
FIG. 4 is a schematic diagram showing a first status of a child safety seat according to a second embodiment of the invention.
Figure 5:
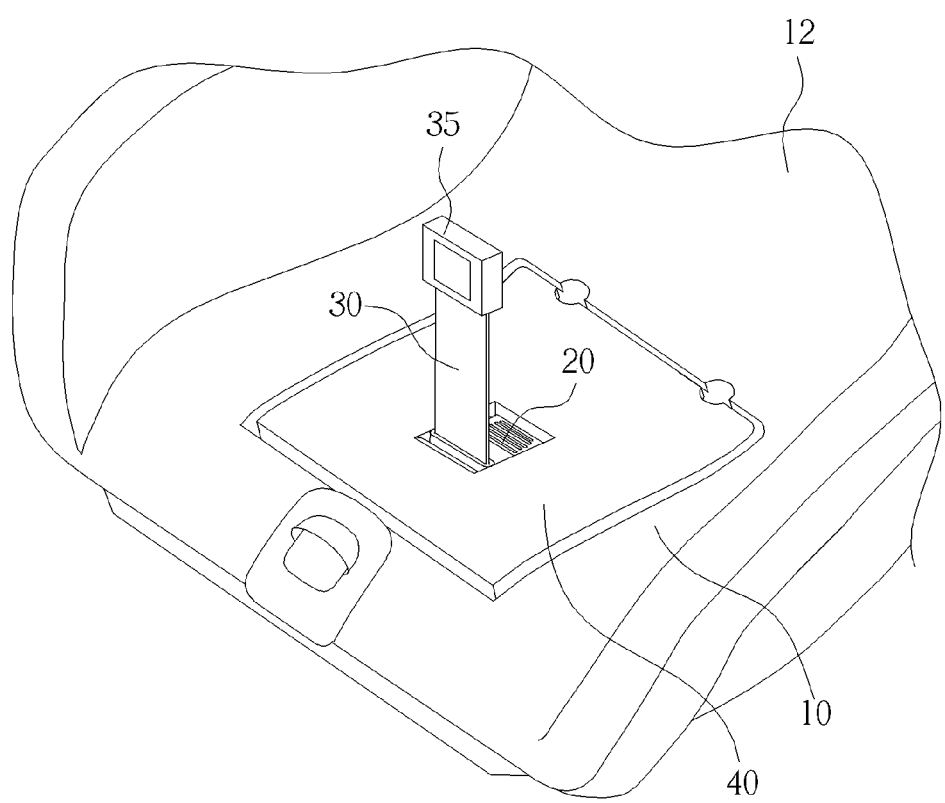
FIG. 5 is a schematic diagram showing a second status of the child safety seat according to the second embodiment of the invention.

In addition to the above embodiment as shown in FIGS. 1-3, the positioner and the crotch belt may also be integral with a vehicle belt lock off panel movably connected to the seat shell. Please refer to FIG. 4 and FIG. 5. FIG. 4 is a schematic diagram showing a first status of a child safety seat according to a second embodiment of the invention, and FIG. 5 is a schematic diagram showing a second status of the child safety seat according to the second embodiment of the invention. In the second embodiment, a panel 40 is rotatably connected to the seat shell 10 where the positioner 20 is movably disposed in an opening 43 of the panel 40. Like the first embodiment as previously described, the positioner 20 and the crotch belt 30 move with respect to the panel 40 to a first position as shown in FIG. 4 or a second position as shown in FIG. 5 along a direction toward the backrest section 12 or away from the backrest section 12 respectively.

Figure 6:
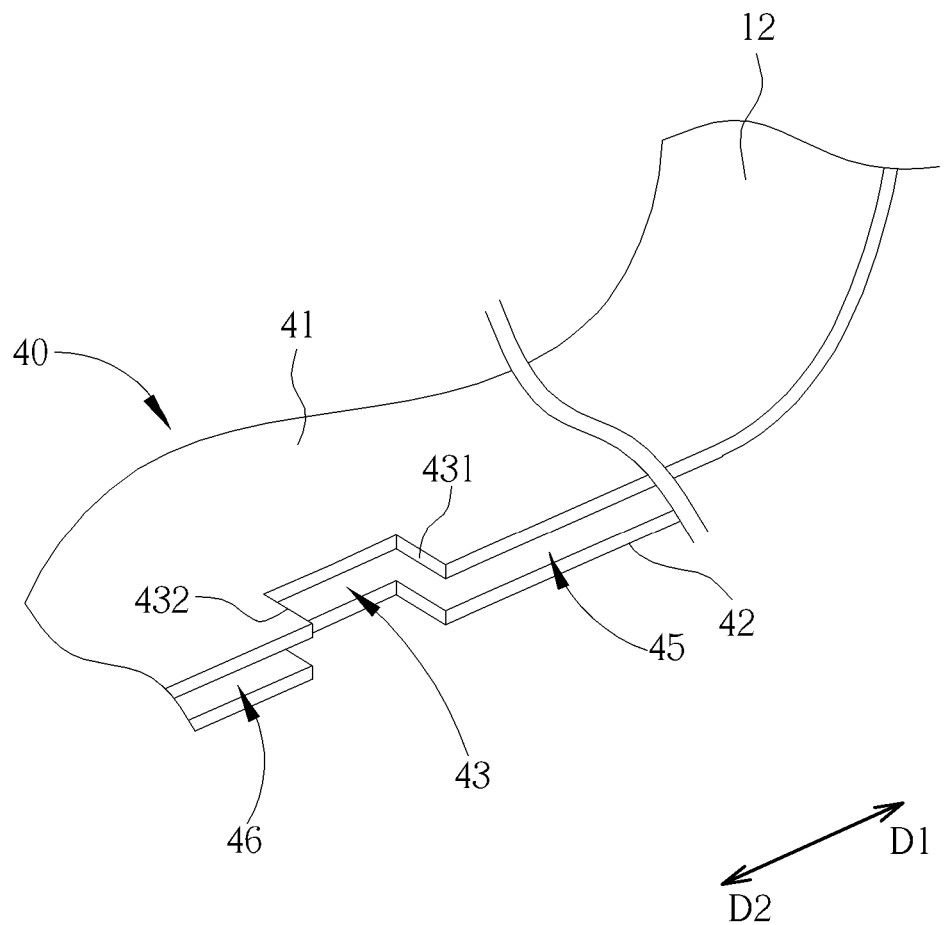
FIG. 6 is a schematic diagram showing a partial cross sectional view of the panel.

Please refer to FIG. 6 to FIG. 8. FIG. 6 is a schematic diagram showing a partial cross sectional view of the panel, FIG. 7 is a schematic diagram of a perspective view of the positioner, and FIG. 8 is a schematic diagram of a side view of the positioner. Referring to FIG. 6, although the panel 40 is discussed, similar structural detail applies on the seat section 12 of the first embodiment as shown in FIGS. 1-3. The panel 40 (or the seat section 14) has a first channel 45 and a second channel 46 between a first side 41 and a second side 42 of the panel 40. The first channel 45 extends from the opening 43 toward the backrest section 12 and the second channel 46 extends from the opening 43 away from the backrest section 12. The opening 43 is defined by a plurality of walls, from which a first wall 431 is located nearest from the backrest section 12 and a second wall 432 is located farthest from the backrest section 12.

Now refer to FIG. 7 and FIG. 8. The positioner 20 includes a first abutting end 24 (a rear latch tab) and a second abutting end 26 (a front latch tab). The first abutting end 24, the slit 22 (previously described in the first embodiment), and the second abutting end 26 align sequentially along direction D2 away from the backrest section 12. Particularly, the first abutting end 24 the second abutting end 26 have wedged cross sections with decreasing thickness toward the slit 22, i.e., the thickness T1 at both ends of the positioner 20 is larger than the thickness T2 close to the central of the positioner 20.

Figure 9:
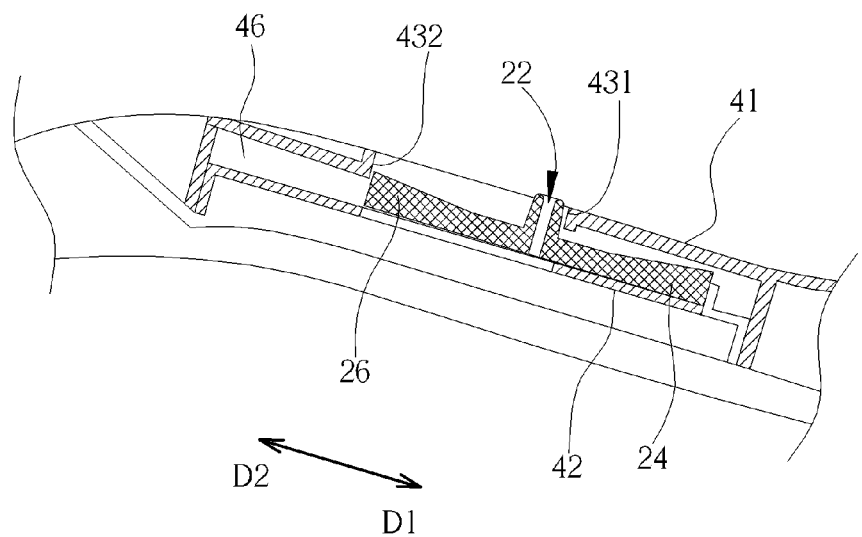
FIG. 9 is a schematic diagram showing a partial side cross sectional view of the child safety seat in FIG. 4.
Figure 10:
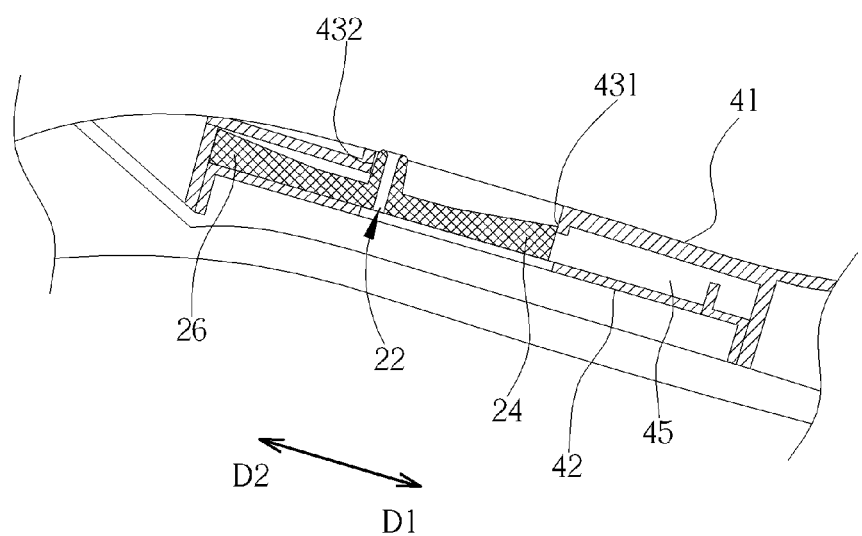
FIG. 10 is a schematic diagram showing a partial side cross sectional view of the child safety seat in FIG. 5.

Please refer to FIG. 9 and FIG. 10. FIG. 9 is a schematic diagram showing a partial side cross sectional view of the child safety seat in FIG. 4 and FIG. 10 is a schematic diagram showing a partial side cross sectional view of the child safety seat in FIG. 5. When the positioner 20 is movably disposed in the opening 43 of the panel 40 (or in the opening 143 of the seat section 14), the first abutting end 24 of the positioner 20 is moveably located in the first channel 45 and the second abutting end 26 of the positioner 20 is moveably located in the second channel 46. In FIG. 9 and FIG. 4, when the positioner 20 is moved toward direction D1 to be configured at the first position (or a rear position for the smaller occupant), the second abutting end 26 is located out of the second channel 46 and abuts against the second wall 432 so as to retain the positioner 20 at the first position. To adjust the positioner 20, depress the second abutting end 26 so that the positioner 20 may be slid along direction D2 until the positioner 20 reaches the second position as shown in FIG. 10 and FIG. 5 (or a front position for the larger occupant). At the second position, the first abutting end 24 is located out of the first channel 45 and abuts against the first wall 431 so as to retain the positioner 20 at the second position.

The child safety seat provides at its seat section a crotch belt assembly to allow the consumer to adjust the crotch belt location without the need to disassemble the child restraint. The positioner uses two tab-like abutting ends that can slide within the channels so that the positioner may be configured at the first position or the second position with respect to the seat section, allowing for quick adjustability from a rear position to a forward position and will give a proper fit for the occupant while reducing the chance for incorrect assembly. The crotch belt runs through the positioner and is connected to the seat shell with the belt attachment. The rear position will be used for the smaller child and is locked into that position by the second abutting end. To adjust, the second abutting end is depressed and the positioner is slid forward until the first abutting end engages. During this process, the length of the crotch belt will automatically adjust for proper fit for the larger child.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat, comprising:
a seat shell comprising a backrest section and a seat section having an opening;
a positioner movably disposed in the opening and configurable at a first position or a second position with respect to the seat section, the positioner comprising a slit; and
a crotch belt, a first end of the crotch belt passing through the slit and extending from a first side of the seat section, a second end of the crotch belt extending from a second side of the seat section and further fixed to the seat section;
wherein the seat section has a first channel between the first side and the second side of the seat section and extending from the opening toward the backrest section, and the seat section has a second channel between the first side and the second side of the seat section and extending from the opening away from the backrest section;
wherein the positioner comprises a first abutting end moveable in the first channel and a second abutting end moveable in the second channel, the first abutting end, the slit, and the second abutting end aligning sequentially along a second direction away from the backrest section;
wherein the first abutting end and the second abutting end have wedged cross sections with decreasing thickness toward the slit;
wherein the crotch belt is moveable with the positioner with respect to the seat section;
wherein a first space bounded by the crotch belt, the backrest section, and the seat section when the crotch belt and the positioner are configured at the first position is smaller than a second space bounded by the crotch belt, the backrest section, and the seat section when the crotch belt and the positioner are configured at the second position.

2. The child safety seat of claim 1, wherein the positioner and the crotch belt are moveable with respect to the seat section along a first direction toward the backrest section to be configured at the first position with a corresponding shortening of the crotch belt and along a second direction away from the backrest section to be configured at the second position with a corresponding lengthening of the crotch belt.

3. The child safety seat of claim 1, wherein the opening is defined by at least a first wall and a second wall located nearest and farthest from the backrest section respectively; when the positioner is configured at the first position, the second abutting end is located out of the second channel and abuts against the second wall to retain the positioner at the first position, and when the positioner is configured at the second position, the first abutting end is located out of the first channel and abuts against the first wall to retain the positioner at the second position.

4. The child safety seat of claim 1, wherein the seat section further comprises a belt attachment detachably assembled to an outer opening of the seat section, and the belt attachment passes through the second end of the crotch belt so that the second end of the crotch belt is fixed to the seat section.

5. The child safety seat of claim 1, wherein the crotch belt further comprises a buckle attached to the first end.

6. A crotch belt assembly for being used on a child safety seat, the child safety seat having a backrest section and a seat section having an opening, the crotch belt assembly comprising:
- a positioner movably disposed in the opening and configurable at a first position or a second position with respect to the seat section, the positioner comprising a slit; and
- a crotch belt, a first end of the crotch belt passing through the slit and extending from a first side of the seat section, a second end of the crotch belt extending from a second side of the seat section and further fixed to the seat section;
- wherein the seat section has a first channel between the first side and the second side of the seat section and extending from the opening toward the backrest section, and the seat section has a second channel between the first side and the second side of the seat section and extending from the opening away from the backrest section, the positioner further comprising:
  - a first abutting end moveable in the first channel; and
  - a second abutting end moveable in the second channel;
  - wherein the first abutting end, the slit, and the second abutting end align sequentially along a second direction away from the backrest section;
  - wherein the first abutting end and the second abutting end have wedged cross sections with decreasing thickness toward the slit;
- wherein the crotch belt is moveable with the positioner with respect to the seat section;
- wherein a first space bounded by the crotch belt, the backrest section, and the seat section when the crotch belt and the positioner are configured at the first position is smaller than a second space bounded by the crotch belt, the backrest section, and the seat section when the crotch belt and the positioner are configured at the second position.

7. The crotch belt assembly of claim 6, wherein the positioner and the crotch belt are moveable with respect to the seat section along a first direction toward the backrest section to be configured at the first position with a corresponding shortening of the crotch belt and along a second direction away from the backrest section to be configured at the second position with a corresponding lengthening of the crotch belt.

8. The crotch belt assembly of claim 6, the opening defined by at least a first wall and a second wall located nearest and farthest from the backrest section respectively;
- wherein when the positioner is configured at the first position, the second abutting end is located out of the second channel and abuts against the second wall to retain the positioner at the first position;
- wherein when the positioner is configured at the second position, the first abutting end is located out of the first channel and abuts against the first wall to retain the positioner at the second position.

9. The crotch belt assembly of claim 6, wherein the seat section has a belt attachment detachably assembled to an outer opening of the seat section and the belt attachment passes through the second end of the crotch belt so that the second end of the crotch belt is fixed to the seat section.

10. The crotch belt assembly of claim 6, wherein the crotch belt further comprises a buckle attached to the first end.

* * * * *